United States Patent
Chen et al.

(10) Patent No.: US 7,327,404 B2
(45) Date of Patent: Feb. 5, 2008

(54) METHODS AND SYSTEMS FOR COLOR IMAGE PROCESSING

(75) Inventors: Hong-Hui Chen, Hsinchuang (TW); Jen-Shi Wu, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 579 days.

(21) Appl. No.: 10/971,241

(22) Filed: Oct. 22, 2004

(65) Prior Publication Data

US 2006/0087591 A1    Apr. 27, 2006

(51) Int. Cl.
*H04N 9/68* (2006.01)
(52) U.S. Cl. ...................................... 348/654; 348/645
(58) Field of Classification Search .............. 348/654, 348/653, 638–641, 643–651, 659, 660, 662
See application file for complete search history.

(56) References Cited

U.S. PATENT DOCUMENTS

| 4,523,221 | A | * | 6/1985 | Chin et al. ................... | 348/651 |
| 4,544,944 | A | | 10/1985 | Chin ........................... | 358/28 |
| 4,562,460 | A | * | 12/1985 | Harwood ..................... | 348/651 |
| 4,587,552 | A | * | 5/1986 | Chin ........................... | 348/651 |
| 6,438,264 | B1 | | 8/2002 | Gallagher et al. ........... | 382/167 |

* cited by examiner

*Primary Examiner*—M. Lee
(74) *Attorney, Agent, or Firm*—Thomas, Kayden, Horstemeyer & Risley

(57) ABSTRACT

Methods and systems of color image processing for color adjustments. Phase information of a received chrominance signal is detected and applied to adjust saturation and hue of the color by changing the magnitude and phase of the chrominance signal respectively. The phase information of the chrominance signal can also be used to adjust the brightness by changing the magnitude of a received luminance signal.

51 Claims, 6 Drawing Sheets

METHODS AND SYSTEMS FOR COLOR IMAGE PROCESSING

BACKGROUND

The invention relates to color image processing, and more specifically, to methods and systems for color adjustment in color image processing.

In color-television systems, a chrominance signal is typically represented by two color signals, I and Q (or U and V), wherein I and Q color signals are Cartesian coordinates of the chrominance signal and are linear transformation of the U and V color signals. I and Q signals represent the weighting of x and y components of the chrominance signal in a Cartesian coordinate system. Whether a chrominance signal is encoded into I and Q signals or U and V signals depends on the standard a video system adopts. In the NTSC standard, I and Q color signals are transmitted simultaneously as quadrature-modulated waves using a single chrominance subcarrier whose phase and amplitude are modulated. I and Q color signals are separated from the chrominance signal by demodulating with the chrominance subcarrier, and subsequent color image processing is performed on the two color signals. I and Q color signals precisely specify the location of the respective picture element in the color plane. Additionally, a luminance signal is fed to a separate processing stage and subsequently combined with the two color signals in a color matrix to generate the value for the red (R), green (G), and blue (B) signals.

The chrominance signal can also be represented by polar coordinates comprising a magnitude signal and an angle signal. The angle signal carries the hue information, and the magnitude signal carries the saturation information of the chrominance signal.

Color adjustment is typically required in color image processing, especially for preferred colors such as flesh-tone, grass green, and sky blue. In U.S. Pat. No. 4,544,944, Chin describes a circuitry performing auto-flesh correction by operating on color mixture signals. The received color mixture signals are demodulated to produce the instantaneous magnitude V_mag and angle V_ang. The signal carrying the demodulated angle V_ang is applied to the address input of a ROM. The ROM is programmed to produce sines and cosines of color corrected angles if the applied angle corresponds to flesh tones. The sine and cosine values from the ROM are multiplied by the demodulated chrominance magnitude. Entries stored in the ROM comprise sinusoidal values, for example, sin 45° and cos 30°, in fixed-point representation, and these values must be rounded before storage. As a result, the corresponding output of the ROM will have errors even if the color corrected angle equals the applied angle when adjustment is not required. The error introduced by the final multiplication operation will be significant for large magnitudes V_mag.

Methods for adjusting both chrominance and luminance color signals, are also proposed. Gallagher in U.S. Pat. No. 6,438,264, for example, teaches a method of compensating the color saturation signal as well as modifying the luminance signal for the application of a tone scale function. The color saturation signal for each pixel is adjusted based on a calculated local slope of the tone scale function.

SUMMARY

Color image processing systems and methods for color adjustment are provided. Some embodiments of a color image processing system comprise a phase differentiator, a programmable memory device, and a rotating stage. The phase differentiator generates phase information for determining a phase of a received chrominance signal. The programmable memory device stores angles of rotation corresponding to various phase information, and outputs a specific angle of rotation upon receiving the phase information from the phase differentiator. The rotating stage applies the specific angle of rotation retrieved from the programmable memory device to the received chrominance signal to adjust hue of the chrominance signal. In some embodiments, the programmable memory device can further store gain factors corresponding to various phase information, and output a specific gain factor upon receiving the phase information from the phase differentiator. A gain stage coupled to the rotating stage applies the specific gain factor retrieved from the programmable memory device to the output of the rotating stage to adjust saturation of the chrominance signal.

A color image processing method determines and generates phase information for determining a phase of a received chrominance signal. A specific angle of rotation is searched from a plurality of angles of rotation corresponding to various phase information according to the generated phase information. The specific angle of rotation is applied to the received chrominance signal to adjust hue of the chrominance signal.

Some embodiments of a color image processing system comprise a phase differentiator, a programmable memory device, a gain stage, and a rotating stage. The phase differentiator generates phase information of a chrominance signal, and the programmable memory device stores gain factors and angles of rotation. The gain stage retrieves a specific gain factor from the programmable memory device corresponding to the phase information, and adjusts saturation of the chrominance signal based on the retrieved gain factor. The rotating stage coupled to the output of the gain stage retrieves a specific angle of rotation from the programmable memory device, and adjusts the hue of the chrominance signal.

Some embodiments of a color image processing method comprise generating phase information of a received chrominance signal; searching for a specific gain factor and angles of rotation according to the phase information; and applying the specific gain factor and angle of rotation to adjust saturation and hue of the chrominance signal respectively.

Some embodiments of a color image processing system comprise a phase differentiator, a programmable memory device, and a luminance gain stage. The phase differentiator generates phase information for determining a phase of a received chrominance signal. The programmable memory device stores luminance gain factors corresponding to various phase information, and outputs a specific luminance gain factor upon receiving the phase information from the phase differentiator. The luminance gain stage applies the specific luminance gain factor retrieved from the programmable memory device to a received luminance signal to adjust luminance signal strength.

An embodiment of a color image processing method generates phase information of a chrominance signal; searches for a specific luminance gain factor according to the generated phase information; and applies the specific luminance gain factor to a luminance signal to adjust luminance signal strength.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1:
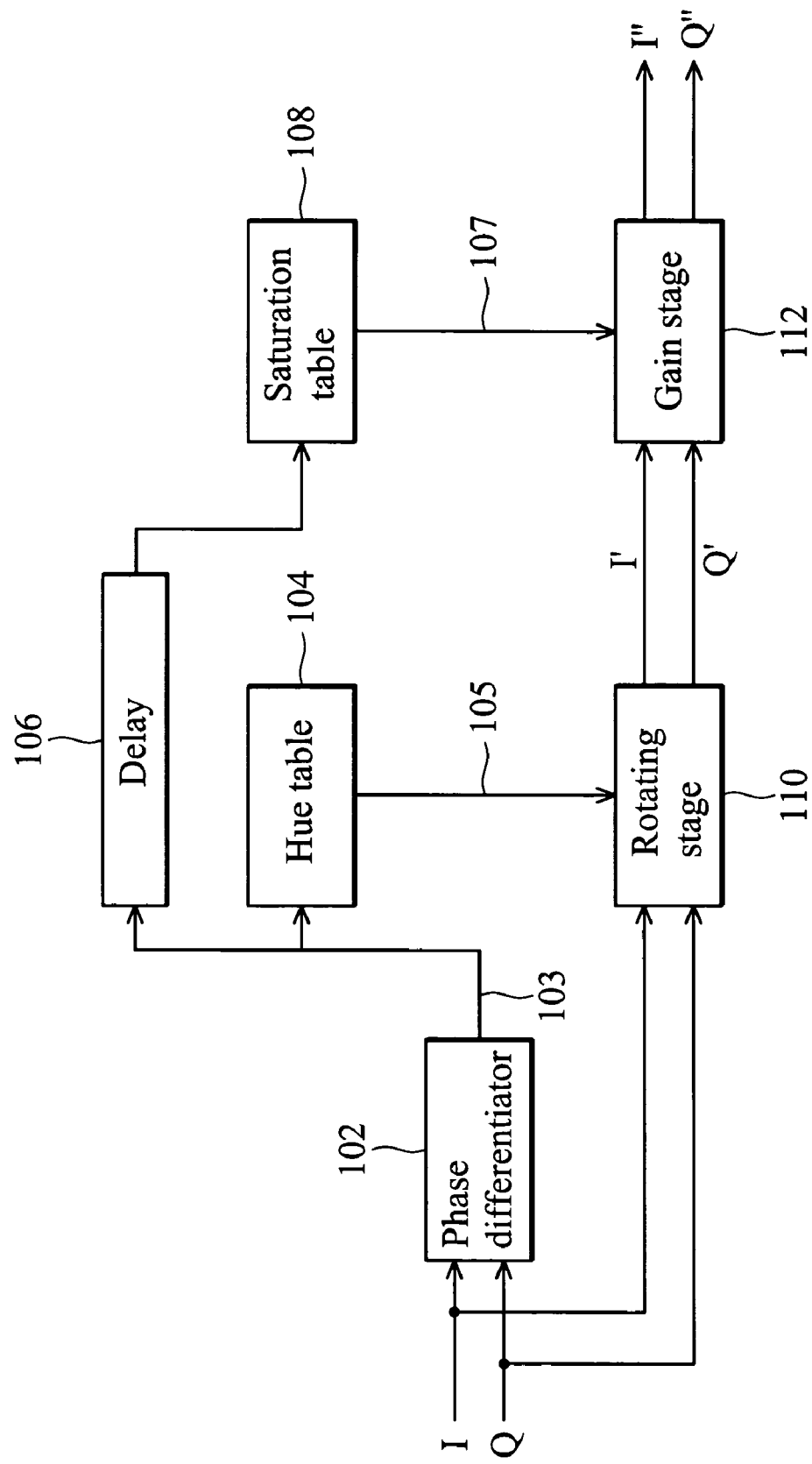
FIG. 1 is an embodiment of the color image processing system for modifying the saturation and hue in a certain chrominance range.

FIG. 1 is an embodiment of the color image processing system for modifying the saturation and hue in a certain chrominance range. An embodiment of the system comprises a phase differentiator 102, a hue table 104, a delay unit 106, a saturation table 108, a rotating stage 110, and a gain stage 112. The input of the phase differentiator 102 is a chrominance signal, represented in Cartesian form I and Q. The phase differentiator 102 calculates phase 103 of the received chrominance signal. In some embodiments, a phase differentiator calculates phase information related to the phase of the chrominance signal, for example, a ratio between I and Q components of the chrominance signal and signs of I and Q components. A phase differentiator determines a ratio between I and Q as well as one of the four coordinate quadrants in which the chrominance signal is located. Another possible realization of the phase differentiator 102 is a cordic phase detector.

The hue table 104 searches for and outputs an angle of rotation 105 corresponding to the phase 103. The angle of rotation 105 is the desired rotation degree for the chrominance signal. The hue table 104 can be stored in a programmable memory device such as static random access memory (SRAM). The rotating stage 110 applies the angle of rotation 105 to the chrominance signal (I,Q) to rotate the original phase accordingly. The phase of the chrominance signal determines the hue of the chrominance signal, thus the hue of the chrominance signal (I,Q) is adjusted in the rotating stage 110.

Figure 2:
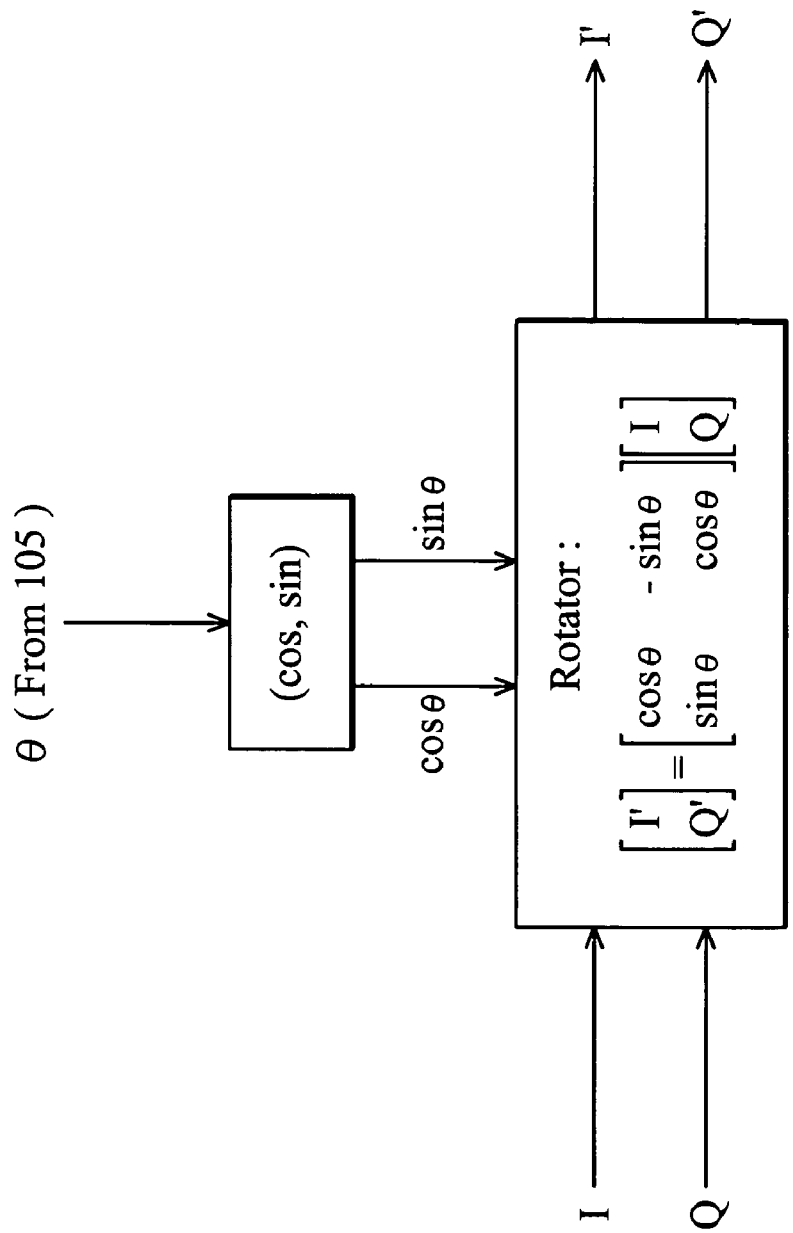
FIG. 2 illustrates a possible implementation of the rotating stage in FIG. 1.
Figure 3:
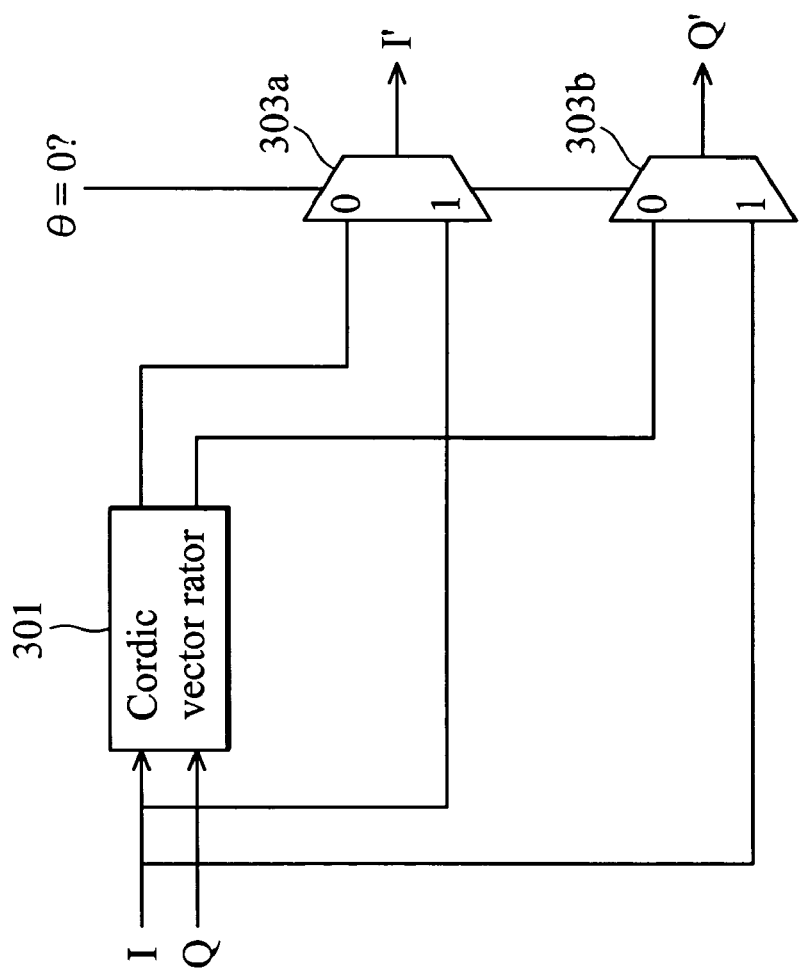
FIG. 3 illustrates a possible implementation of the rotating stage in FIG. 1.

FIGS. 2 and 3 illustrate two possible implementations of the rotating stage 110 of FIG. 1. In FIG. 2, the input chrominance signal (I,Q) is provided to a matrix to obtain the rotated chrominance signal (I',Q'). The cosine and sine values of the angle of rotation are retrieved, and the rotation operation is accomplished by the matrix. Note that the angle of rotation in FIGS. 2 and 3 is identified by the Greek symbol θ. The matrix operation typically requires four multipliers. In FIG. 3, a cordic vector rotator 301 is used to adjust the hue of the chrominance signal, and two multiplexers 303a and 303b bypass the input signal if the angle of rotation is zero. The cordic vector is a simple and cheap alternative as it mainly contains adders, but the output signal is less precise compared to the matrix output shown in FIG. 2.

Figure 4:
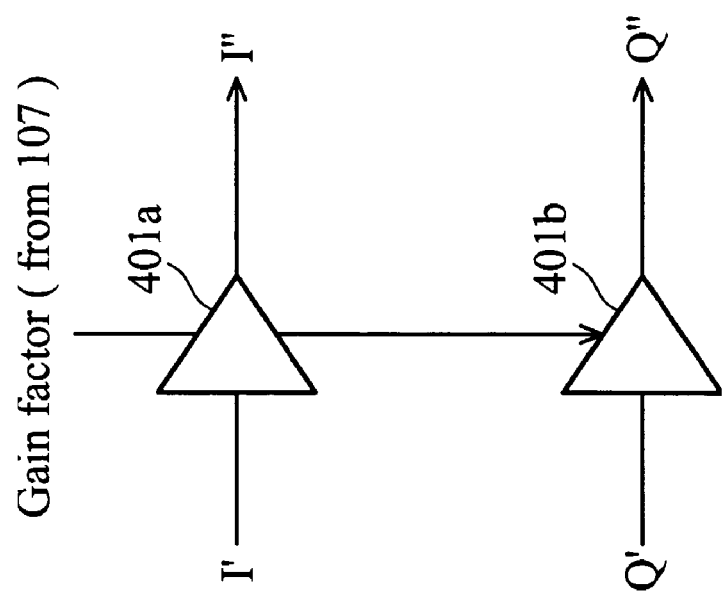
FIG. 4 illustrates a possible implementation of the gain stage in FIG. 1.

The hue adjusted chrominance signal (I',Q') output from the rotating stage 110 is received by the gain stage 112. The saturation table 108 obtains the phase 103 from the delay unit 106, and the delay unit 106 compensates for the computational delay introduced by the rotating stage 110. The saturation table 108 searches for and outputs a gain factor 107 according to the phase 103. The gain stage 112 adjusts the magnitude of the chrominance signal (I',Q') according to the gain factor 107, and generates the chrominance signal (I'',Q''). The magnitude of the chrominance signal affects the saturation of the color, and thus the gain stage 112 adjusts the saturation of the chrominance signal. The gain stage 112 can be implemented by two multipliers (or amplifiers) 401a and 401b to perform multiplication operations separately on I' and Q' of the chrominance signal as shown in FIG. 4.

The content of the two tables 104 and 108 can be as precise as the output of the phase differentiator 102. For example, if the phase output from the phase differentiator is accurate to 1 degree, the tables can store an entry corresponding to each possible phase input from 0 to 359 degrees. In some embodiments, the tables can only store entries for a portion of the possible phase input, and for the remaining phase inputs, an interpolation method, such as a linear interpolation method, is used to calculate a corresponding value.

Figure 5:
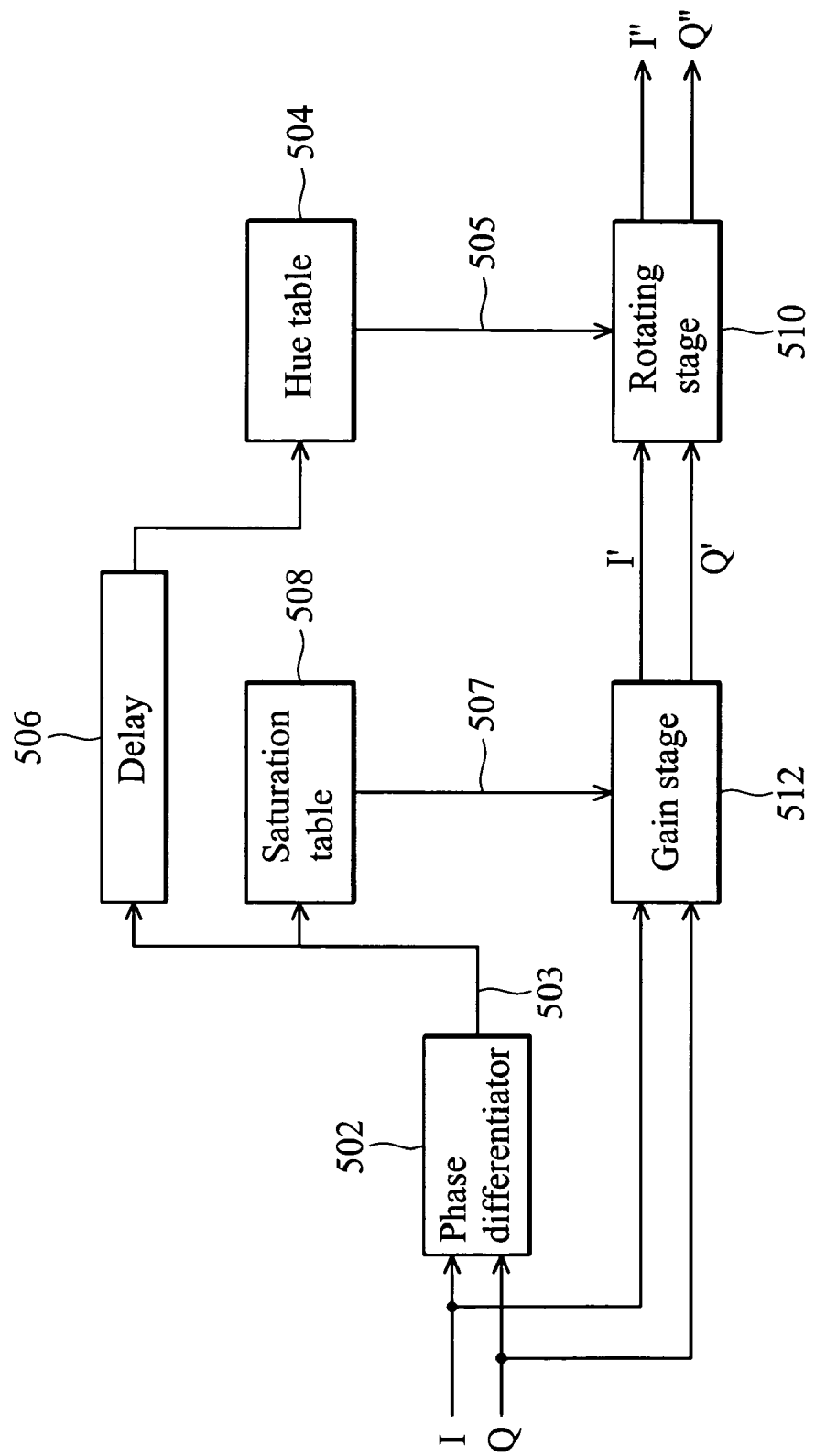
FIG. 5 shows an embodiment of a color image processing system for adjusting the saturation and hue in a certain chrominance range.

FIG. 5 shows an embodiment of a color image processing system for adjusting the saturation and hue in a certain chrominance range. The color image system is similar to the system shown in FIG. 1, except the gain stage 512 is performed first followed by the rotating stage 510. The gain stage 512 adjusts the saturation of the input chrominance signal (I,Q) according to a gain factor 507 output from the saturation table 508. The rotating stage 510 subsequently adjusts the hue of chrominance signal (I',Q') according to the angle of rotation 505 output from the hue table 504.

Figure 6:
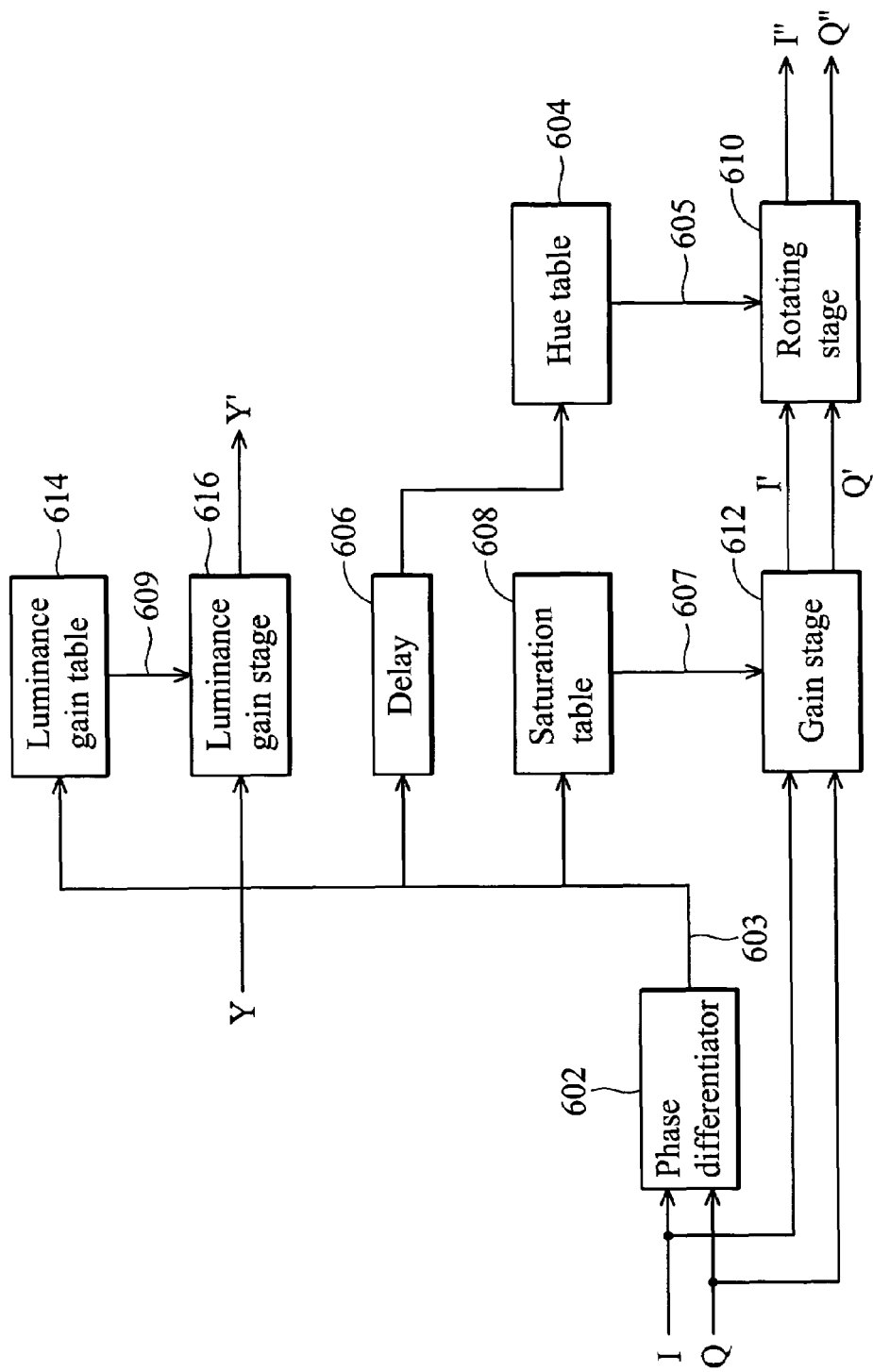
FIG. 6 shows an embodiment of a color image system capable of adjusting the chrominance signal as well as the luminance signal.

In some embodiments, the phase of the chrominance signal is provided to another table to acquire a luminance gain factor, and a luminance signal is adjusted according to the luminance gain factor in a luminance gain stage. The strength of the luminance signal can thus be modified by the detected chrominance phase. Note that a picture element can be described by the luminance and chrominance signals. FIG. 6 shows an embodiment of a color image system capable of adjusting the chrominance signal as well as the luminance signal. The color image system of FIG. 6 comprises a phase differentiator 602, a saturation table 608, a hue table 604, a luminance gain table 614, a gain stage 612, a rotating stage 610, a luminance gain stage 616, and a delay unit 606. The phase 603 of the chrominance signal (I,Q) is provided to the luminance gain table 614, which searches for a luminance gain factor 609 using the phase 603 as a key. The luminance gain stage 616 adjusts the magnitude of a luminance signal Y according to the luminance gain factor 609, and outputs an adjusted luminance gain signal Y'. Similar to the gain stage 612, the luminance gain stage 616 can be implemented by multiplication operations. The luminance signal is required for modification of brightness of certain ranges of colors to be presented on a display or TV.

While the invention has been described by way of example and in terms of preferred embodiments, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A color image processing system for color adjustment, comprising:
    a phase differentiator, generating phase information for determining a phase of a received chrominance signal;
    a programmable memory device, storing angles of rotation corresponding to various phase information, and outputting a specific angle of rotation upon receiving the phase information from the phase differentiator; and
    a rotating stage, configured to rotate the received chrominance signal by the specific angle of rotation using a matrix rotating algorithm, such that hue of the chrominance signal is adjusted.

2. The color image processing system according to claim 1, wherein the programmable memory device further stores gain factors corresponding to various phase information, and outputs a specific gain factor upon receiving the phase information from the phase differentiator, and the color image processing system further comprises a gain stage, applying the specific gain factor retrieved from the programmable memory device to the output of the rotating stage to adjust saturation of the chrominance signal.

3. The color image processing system according to claim 1, wherein the phase information comprises a ratio of two vector components of the chrominance signal and signs of the vector components or a quadrant in which the chrominance signal is located.

4. The color image processing system according to claim 1, wherein the phase information comprises the phase of the chrominance signal.

5. The color image processing system according to claim 1, wherein the programmable memory device stores an angle of rotation for every possible entry of the phase information generated by the phase differentiator.

6. The color image processing system according to claim 1, wherein the programmable memory device stores an angle of rotation for each preset value among possible entries of the phase information generated by the phase differentiator, and outputs at least one angle of rotation related to the phase information received from the phase differentiator.

7. The color image processing system according to claim 6, wherein the specific angle of rotation is calculated using an interpolation method based on the angle of rotation output from the programmable memory device.

8. The color image processing system according to claim 1, wherein the rotating stage comprises a cordic vector rotator and two multiplexers, the cordic vector rotator calculates a phase rotated chrominance signal according to the specific angle of rotation, and the two multiplexers allow the received chrominance signal to bypass the cordic vector rotator if the specific angle of rotation is zero.

9. The color image processing system according to claim 1, wherein the programmable memory device stores luminance gain factors corresponding to various phase information, and outputs a specific luminance gain factor upon receiving the phase information from the phase differentiator, and the color image processing system further comprises a luminance gain stage, applying the specific luminance gain factor retrieved from the programmable memory device to a received luminance signal to adjust luminance signal strength.

10. A color image processing method for color adjustment, comprising:
    generating phase information for determining a phase of a received chrominance signal;
    searching a plurality of angles of rotation corresponding to various phase information for a specific angle of rotation according to the generated phase information; and rotating the received chrominance signal by the specific angle of rotation using a matrix algorithm, such that hue of the chrominance signal is adjusted.

11. The color image processing method according to claim 10, further comprising:
    searching a plurality of gain factors corresponding to various phase information for a specific gain factor according to the generated phase information; and
    applying the specific gain factor to the hue adjusted chrominance signal to adjust saturation of the chrominance signal.

12. The color image processing method according to claim 10, wherein the phase information comprises a ratio of two vector components of the chrominance signal and signs of the vector components or a quadrant in which the chrominance signal is located.

13. The color image processing method according to claim 10, wherein the phase information comprises the phase of the chrominance signal.

14. The color image processing method according to claim 10, wherein every possible entry of the phase information corresponds to one of the angles of rotation.

15. The color image processing method according to claim 10, wherein only a portion of possible entries of the phase information corresponds to the angles of rotation and at least one angle of rotation is output according to the generated phase information.

16. The color image processing method according to claim 15, further comprising calculating a specific angle of rotation using an interpolation method based on the at least one angle of rotation output.

17. The color image processing method according to claim 10, wherein applying the specific angle of rotation comprises performing a cordic vector rotation to calculate a phase rotated chrominance signal according to the specific angle of rotation, and if the specific angle of rotation is zero, bypassing the cordic vector rotation.

18. The color image processing method according to claim 10, further comprising:
    searching a plurality of luminance gain factors corresponding to various phase information for a specific luminance gain factor according to the generated phase information; and
    applying the specific luminance gain factor to a received luminance signal to adjust luminance signal strength.

19. A color image processing system for color adjustment, comprising:
    a phase differentiator, generating phase information for determining a phase of a received chrominance signal;
    a programmable memory device, storing gain factors and angles of rotation corresponding to various phase information, and outputting a specific gain factor and angle of rotation upon receiving the phase information from the phase differentiator;
    a gain stage, applying the specific gain factor retrieved from the programmable memory device to the received chrominance signal to adjust saturation of the chrominance signal; and
    a rotating stage, applying the specific angle of rotation retrieved from the programmable memory device to the output of the gain stage to adjust hue of the chrominance signal.

20. The color image processing system according to claim 19, wherein the phase information comprises a ratio of two vector components of the chrominance signal and signs of the vector components or a quadrant in which the chrominance signal is located.

21. The color image processing system according to claim 19, wherein the phase information comprises the phase of the chrominance signal.

22. The color image processing system according to claim 19, wherein the programmable memory device stores a gain factor for every possible entry of the phase information generated by the phase differentiator.

23. The color image processing system according to claim 19, wherein the programmable memory device stores a gain factor for each preset value among possible entries of the phase information generated by the phase differentiator, and output at least one gain factor related to the phase information received from the phase differentiator.

24. The color image processing system according to claim 23, wherein the specific gain factor is calculated using an interpolation method based on the gain factor output from the programmable memory device.

25. The color image processing system according to claim 19, wherein the gain stage comprises an amplifier adjusting the saturation according to the specific gain factor.

26. The color image processing system according to claim 19, wherein the rotating stage performs a matrix calculation on the adjusted chrominance signal output from the gain stage to adjust the hue by altering the phase of the received chrominance signal.

27. The color image processing system according to claim 19, wherein the rotating stage comprises a cordic vector rotator and two multiplexers, the cordic vector rotator calculates a phase rotated chrominance signal according to the specific angle of rotation, and the two multiplexers allow the saturation adjusted chrominance signal to bypass the cordic vector rotator if the specific angle of rotation is zero.

28. The color image processing system according to claim 19, wherein the programmable memory device further stores luminance gain factors corresponding to various phase information, and outputs a specific luminance gain factor upon receiving the phase information from the phase differentiator, and the color image processing system further comprises a luminance gain stage, applying the specific luminance gain factor retrieved from the programmable memory device to a received luminance signal to adjust luminance signal strength.

29. A color image processing method for color adjustment, comprising:
    generating phase information for determining a phase of a received chrominance signal;
    searching a plurality of gain factors and angles of rotation corresponding to various phase information for a specific gain factor and angle of rotation according to the generated phase information;
    applying the specific gain factor to the received chrominance signal to adjust saturation of the chrominance signal; and
    applying the specific angle of rotation to the saturation adjusted chrominance signal to adjust hue of the chrominance signal.

30. The color image processing method according to claim 29, wherein the phase information comprises a ratio of two vector components of the chrominance signal and signs of the vector components or a quadrant in which the chrominance signal is located.

31. The color image processing method according to claim 29, wherein the phase information comprises the phase of the chrominance signal.

32. The color image processing method according to claim 29, wherein every possible entry of the phase information corresponds to one of the gain stages corresponding to various phase information.

33. The color image processing method according to claim 29, wherein only a portion of possible entries of the phase information corresponds to the gain factors and at least one gain factor is output according to the generated phase information.

34. The color image processing method according to claim 33, further comprising calculating a specific gain factor using an interpolation method based on at least one gain factor output according to the generated phase information.

35. The color image processing method according to claim 29, wherein applying the specific angle of rotation comprises performing a matrix calculation on the saturation adjusted chrominance signal to alter the phase of the chrominance signal, thereby adjusting the hue.

36. The color image processing method according to claim 29, wherein applying the specific angle of rotation comprises performing a cordic vector rotation to calculate a phase rotated chrominance signal according to the specific angle of rotation, and if the specific angle of rotation is zero, bypassing the cordic vector rotation.

37. The color image processing method according to claim 29, further comprising:
    searching a plurality of luminance gain factors corresponding to various phase information for a specific luminance gain factor according to the generated phase information; and
    applying the specific luminance gain factor to a received luminance signal to adjust luminance signal strength.

38. A color image processing system for color adjustment, comprising:
    a phase differentiator, generating phase information for determining a phase of a received chrominance signal;
    a programmable memory device, storing luminance gain factors corresponding to various phase information, and outputting a specific luminance gain factor upon receiving the phase information from the phase differentiator; and
    a luminance gain stage, applying the specific luminance gain factor retrieved from the programmable memory device to a received luminance signal to adjust luminance signal strength.

39. The color image processing system according to claim 38, wherein the programmable memory device further stores gain factors corresponding to various phase information, and outputs a specific gain factor upon receiving the phase information from the phase differentiator, and the color image processing system further comprising a gain stage, applying the specific gain factor retrieved from the programmable memory device to the received chrominance signal to adjust saturation of the chrominance signal.

40. The color image processing system according to claim 38, wherein the phase information comprises a ratio of two vector components of the chrominance signal and signs of the vector components or a quadrant in which the chrominance signal is located.

41. The color image processing system according to claim 38, wherein the phase information comprises the phase of the chrominance signal.

42. The color image processing system according to claim 38, wherein the programmable memory device stores a luminance gain factor for every possible entry of the phase information generated by the phase differentiator.

43. The color image processing system according to claim 38, wherein the programmable memory device stores a luminance gain factor for each preset value among possible entries of the phase information generated by the phase differentiator, and output at least one luminance gain factor related to the phase information retrieved from the phase differentiator.

44. The color image processing system according to claim 43, wherein the specific luminance gain factor is calculated using an interpolation method based on the angle of rotation output from the programmable memory device.

45. A color image processing method for color adjustment, comprising:
generating phase information for determining a phase of a received chrominance signal;
searching a plurality of luminance gain factor corresponding to various phase information for a specific luminance gain factor according to the generated phase information; and
applying the specific luminance gain factor to a received luminance signal to adjust luminance signal strength.

46. The color image processing method according to claim 45, further comprising:
searching a plurality of gain factors corresponding to various phase information for a specific gain factor according the generated phase information; and
applying the specific gain factor to the received chrominance signal to adjust saturation of the chrominance signal.

47. The color image processing method according to claim 45, wherein the phase information comprises a ratio of two vector components of the chrominance signal and signs of the vector components or a quadrant in which the chrominance signal is located.

48. The color image processing method according to claim 45, wherein the phase information comprises the phase of the chrominance signal.

49. The color image processing method according to claim 45, wherein every possible entry of the phase information corresponds to one of the luminance gain factors.

50. The color image processing method according to claim 45, wherein only a portion of possible entries of the phase information corresponds to the luminance gain factors and at least one luminance gain factor is output according to the generated phase information.

51. The color image processing method according to claim 50, further comprising calculating a specific luminance gain factor using an interpolation method based on at least one luminance gain factor output according to the generated phase information.

* * * * *